United States Patent [19]

Morrison

[11] 4,288,087
[45] Sep. 8, 1981

[54] SIMPLIFIED SNOWMOBILE SUPPORT DOLLY

[75] Inventor: Robert I. Morrison, Delavan, Wis.

[73] Assignee: MPD Enterprises of Delavan, Inc., Delavan, Wis.

[21] Appl. No.: 60,485

[22] Filed: Jul. 25, 1979

[51] Int. Cl.³ .............................................. B62B 1/10
[52] U.S. Cl. ................................ 280/47.32; 180/182; 280/8; 280/79.1 A
[58] Field of Search ............................ 180/182, 183; 280/47.15, 47.13 R, 47.32, 8, 79.1

[56] References Cited

U.S. PATENT DOCUMENTS

| | | | |
|---|---|---|---|
| 1,339,861 | 5/1920 | Paddon | 280/47.13 R |
| 3,437,354 | 4/1969 | Hetteen | 280/47.15 |
| 3,734,532 | 5/1973 | Mattson | 180/182 |
| 3,860,078 | 1/1975 | Stoick | 180/183 |
| 3,881,740 | 5/1975 | Johnson | 280/79.1 A |

OTHER PUBLICATIONS

Dollie Model R2, p. 10 of "That is Easy to Use for the Moving of".

*Primary Examiner*—John P. Silverstrim
*Attorney, Agent, or Firm*—Quarles & Brady

[57] ABSTRACT

A snowmobile support dolly has a pair of two-wheeled H-frame ski dollies and a caster wheeled H-frame track dolly for supporting the steering skis and drive track, respectively, of a snowmobile. The ski dollies clamp to the bottom of the steering skis, and the track dolly has spaced transverse members which hold it in place between the transverse ribs of the track, so that the snowmobile is easily wheeled about.

1 Claim, 6 Drawing Figures

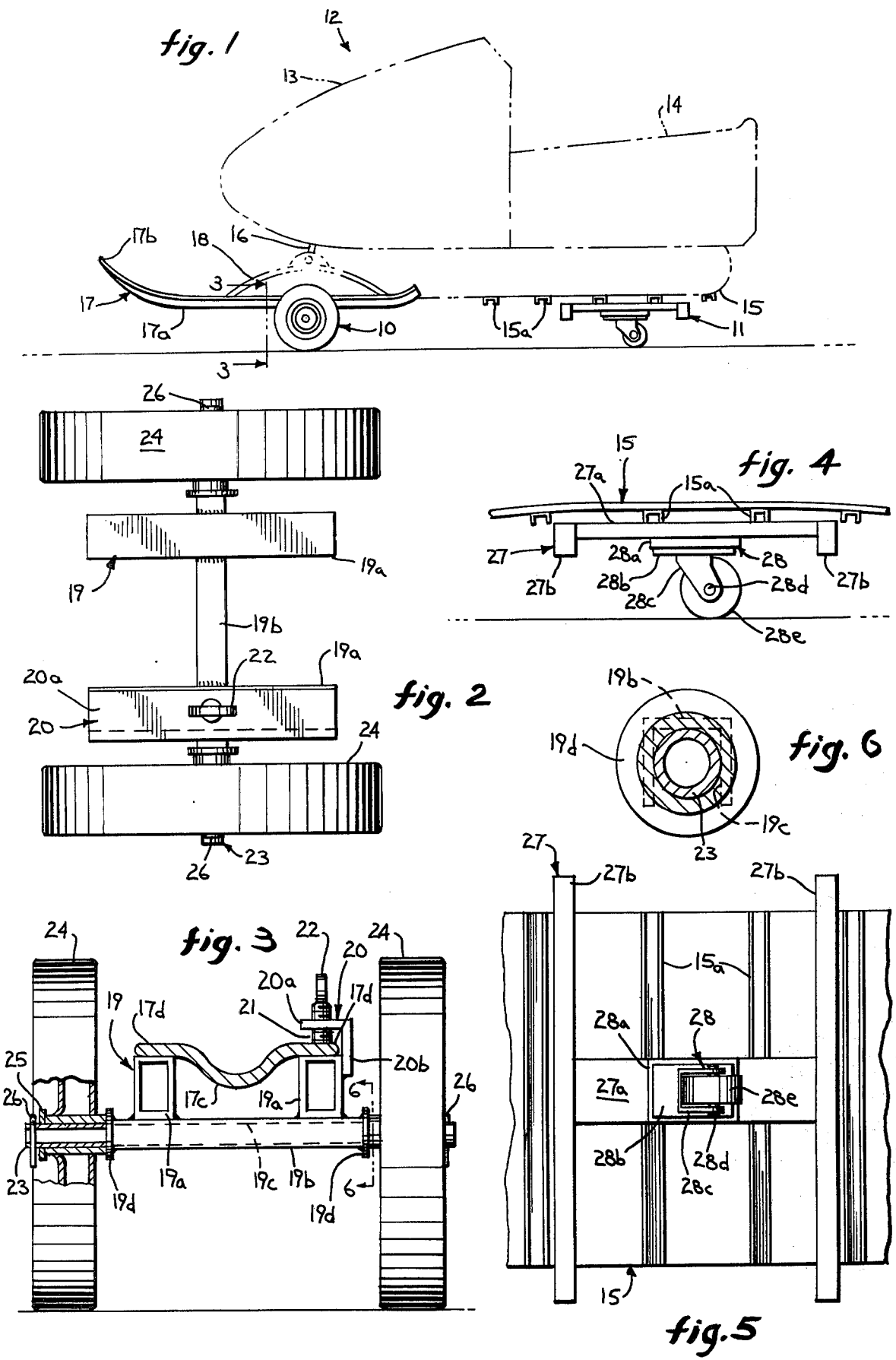

SIMPLIFIED SNOWMOBILE SUPPORT DOLLY

BACKGROUND OF THE INVENTION

1. Field of the Invention

The invention relates to dollies for movably supporting a snowmobile.

2. Description of the Prior Art

To conveniently store a snowmobile in an automobile garage or other enclosed area, the snowmobile should be readily movable into and out of the storage area. The task of manually moving a snowmobile is difficult when the steering skis and power driven track are resting on a garage floor, for example. Snowmobile support devices are disclosed in Stoick, U.S. Pat. Nos. 3,860,078, issued Jan. 14, 1975; Mattson, 3,734,532, issued May 22, 1973; and Hetteen, 3,437,354, issued Apr. 8, 1969. Of these patents, U.S. Pat. No. 3,860,078 shows a dolly, while the other two patents show support apparatuses that perform other transport functions. A simplified dolly could gain wide acceptance if its cost to manufacturers and consumers can be minimized, while providing the necessary mobility and support to a snowmobile in temporary storage.

SUMMARY OF THE INVENTION

The invention provides dolly apparatus that cooperates to movably support a snowmobile having a pair of laterally spaced apart elongated skis towards its front end and an endless track below and towards its back end, where the track is longitudinally movable and has a plurality of transverse ribs for traction. The dolly apparatus includes a pair of ski dollies, each having an H-frame that carries an axle substantially parallel to its cross bar with wheels on opposite ends of the axle, and each H-frame having a clamping member disposed along one of its elongated end portions, the clamping member being operable to clamp the frame to the bottom of a respective ski. A track dolly has an H-frame and a caster wheel assembly supporting the cross bar of the H-frame intermediate the elongated end portions of the H-frame, which end portions are adapted to engage the snowmobile track transversely between the transverse ribs and pivotally support the back end of the snowmobile.

The ski dollies may be assembled so that the elongated end portions project above the connecting cross bar and are spaced apart to provide an opening in which a rounded bottom portion of a ski is received. A ski is supported on each of the ski dollies, and a thumbscrew is tightened on each of the ski dollies to clamp them to the snowmobile skis. The track dolly is then slid beneath the track to provide a pivotal support, the transverse members of its H-frame being prevented from slipping forward or backward along the track by engagement with the transverse ribs that are ordinarily a part of such snowmobile tracks.

The dolly apparatus is relatively simple to manufacture, once the combination of supporting members described herein is appreciated. The constituent parts are commonly available at reasonable cost, and it follows that an object of the invention is to provide a lower cost snowmobile dolly than has been available prior to the invention.

The invention may be more readily understood by reference to the accompanying drawing to be briefly described, and the detailed description of a preferred embodiment of the invention. Such embodiment does not necessarily represent the full scope of the invention, which is defined by the appended claims.

BRIEF DESCRIPTION OF THE DRAWING

FIG. 1 is a side elevational view showing the dolly apparatus of the present invention as it supports a snowmobile;

FIG. 2 is an enlarged, plan view of one of the ski dollies of FIG. 1;

FIG. 3 is a sectional view taken in the plane indicated by line 3-3 in FIG. 1;

FIG. 4 is an enlarged, side elevational view of the track dolly of FIG. 1;

FIG. 5 is a plan view of the track dolly of FIG. 4 in position below the snowmobile track; and FIG. 6 is a sectional view taken in the plane indicated by line 6-6 in FIG. 3.

DETAILED DESCRIPTION OF THE PREFERRED EMBODIMENT

Referring to FIG. 1, dolly apparatus constructed according to the present invention includes a front pair of ski-supporting dollies, generally designated 10, and a rear track-supporting dolly, generally designated 11, the dollies 10 and 11 cooperating to support a snowmobile, generally designated 12, which includes a hull 13, a seat 14 and an endless ground engagable drive track 15 below the seat 14 and towards the back end of the snowmobile 10. The front end of the snowmobile includes a pair of laterally spaced apart kingpins 16 supported on skis, generally designated 17, by leaf spring assemblies 18. The skis 17 each have a longitudinal runner 17a and an upturned tip 17b. The longitudinally disposed drive track 15 has a plurality of transverse ribs 15a spaced along its length to provide traction against the ground over which the snowmobile travels.

Referring to FIGS. 2 and 3, the front ski supporting dollies 10 each have a pair of spaced apart, longitudinally oriented, box steel members 19a supported by a U-channel member 19b, which serves as a cross bar, being welded near its opposite ends to the bottom of the longitudinally disposed end members 19a. The cross bar 19b is connected medial the ends of the two longitudinal end members 19a to form an H-frame, generally designated 19. Referring particularly to FIG. 3, each ski 17 includes a depressed, longitudinal, steering rib 17c, seen in section, which is received in the space between the longitudinal end members 19a, while the edges 17d of the ski rest on these longitudinal members 19a. As seen in FIGS. 2 and 3, an angle member 20 with a side flange 20a and a top flange 20b extends the length of one of the longitudinal end members 19a and is welded to the side of it, so that the top flange 20a is spaced apart from a top transverse portion of that longitudinal member 19a to form a slot 21 opening laterally towards the space between the longitudinal members 19a to receive the edge of a ski 17 to be supported thereon. A thumbscrew 22 extends through the top flange 20a into the slot 21 and is threadingly engaged in the top flange 20a for advancement against the edge 17d of a ski 17 received in the slot 21. As seen in FIG. 6, the U-channel member 19b defines a trough 19c and is supported on a hollow axle 23 that extends through the trough 19c and is journaled through a pair of circular end flanges 19d enclosing the opposite ends of the trough 19c. Referring again to FIG. 3, dolly wheels 24 are rotatably supported by the end portions of the axle 23 that extend outwardly from the end flanges 19c, and are each held in place by a washer 25 and a cotter pin 26 lodged in an outer extremity of the axle 23 outside each wheel hub.

Referring to FIGS. 4 and 5, the track dolly 11 includes a cross bar 27a made of two box steel members, and a pair of spaced apart transverse support members 27b, which are approximately as long as the width of the snowmobile track. The cross bar 27a, which is intended to be longitudinally disposed beneath the track 15 as seen in FIG. 1, is welded to the transverse supports 27b medial their ends to form an H-shape frame, generally designated 27. A caster wheel assembly 28 is mounted to the bottom of the longitudinal cross bar member 27a medial of the welds to the transverse supports 27b. The caster wheel assembly 28 includes a support plate 28a and a pivot plate 28b which enclose a plurality of bearings (not shown). The pivot plate 28b is supported by a wheel mounting bracket 28c and an axle 28d therethrough on which the caster wheel 28e is mounted. The caster wheel assembly 28 provides a pivotable support for the rear end of the snowmobile 12, so that it can be pivoted around the area on which the ski dolly wheels 24 are situated. As seen in FIGS. 4 and 5, portions of the snowmobile track 15 just beyond the front and back of the track dolly 11 tend to sag a little so that the track dolly 11 is prevented from sliding longitudinally along the track 15 by the engagement of its transverse members 27b with the transverse ribs 15a.

I claim:

1. A single-wheeled dolly adapted to support a snowmobile having a longitudinally extending, endless drive track including a plurality of transverse traction ribs, said dolly comprising:

a pair of spaced apart transverse supports having a length generally similar to the width of said track; at least one elongated member interconnecting said transverse supports; and only one wheel, said wheel comprising a caster wheel pivotally mounted to said elongated member intermediate said transverse members, said dolly adapted to support said track with said transverse supports extending parallel to said ribs, whereby said dolly is prevented from sliding longitudinally along said track by engagement of one of said ribs with one of said transverse supports.

* * * * *